United States Patent
Lai et al.

(10) Patent No.: US 9,549,215 B1
(45) Date of Patent: *Jan. 17, 2017

(54) TELEVISION ADVERTISEMENT MONITORING SYSTEM

(71) Applicant: The DIRECTV Group, Inc., El Segundo, CA (US)

(72) Inventors: Timothy Lai, Fountain Valley, CA (US); Robert G. Arsenault, Redondo Beach, CA (US)

(73) Assignee: The DirecTV Group, Inc., El Segundo, CA (US)

( * ) Notice: Subject to any disclaimer, the term of this patent is extended or adjusted under 35 U.S.C. 154(b) by 192 days.

This patent is subject to a terminal disclaimer.

(21) Appl. No.: 14/298,584

(22) Filed: Jun. 6, 2014

Related U.S. Application Data

(63) Continuation of application No. 13/492,656, filed on Jun. 8, 2012, now Pat. No. 8,752,084, which is a continuation of application No. 12/172,126, filed on Jul. 11, 2008, now Pat. No. 8,209,713.

(51) Int. Cl.
| | |
|---|---|
| *H04N 7/10* | (2006.01) |
| *H04N 7/173* | (2011.01) |
| *H04N 21/442* | (2011.01) |
| *H04N 21/81* | (2011.01) |
| *H04N 21/61* | (2011.01) |

(52) U.S. Cl.
CPC ........ *H04N 21/442* (2013.01); *H04N 21/6193* (2013.01); *H04N 21/812* (2013.01)

(58) Field of Classification Search
CPC ............................... H04N 20/14; H04N 60/32
USPC ............................ 725/10, 14, 18, 20, 22, 32
See application file for complete search history.

(56) References Cited

U.S. PATENT DOCUMENTS

| | | | |
|---|---|---|---|
| 7,174,126 B2 * | 2/2007 | McElhatten | G06F 3/0482 348/E5.104 |
| 2007/0094689 A1 * | 4/2007 | McElhatten | G06F 3/0482 725/58 |

* cited by examiner

*Primary Examiner* — Kieu Oanh T Bui

(57) ABSTRACT

The present invention discloses systems for monitoring advertisements. A system for monitoring advertisements in a broadcast television channel in accordance with the present invention comprises a sound level monitor for monitoring an audio level of a first broadcast television channel, a data tagger, coupled to the sound level monitor, for tagging a start and an end of an advertisement segment within the first broadcast television channel, and a receiver, wherein when the receiver is first tuned to the first broadcast channel and then tuned to a second broadcast channel, an on-screen display is displayed on a monitor displaying the second broadcast channel, the OSD being displayed when the end of the advertisement segment within the first broadcast channel occurs.

25 Claims, 4 Drawing Sheets

TELEVISION ADVERTISEMENT MONITORING SYSTEM

BACKGROUND OF THE INVENTION

1. Field of the Invention

The present invention relates generally to satellite video systems, and in particular, to a method, apparatus, and article of manufacture for an advertisement monitoring system.

2. Description of the Related Art

Satellite broadcasting of communications signals has become commonplace. Satellite distribution of commercial signals for use in television programming currently utilizes multiple feedhorns on a single Outdoor Unit (ODU) which supply signals to up to eight IRDs on separate cables from a multiswitch.

FIG. 1 illustrates a typical satellite television installation of the related art.

System 100 uses signals sent from Satellite A (SatA) 102, Satellite B (SatB) 104, and Satellite C (SatC) 106 that are directly broadcast to an Outdoor Unit (ODU) 108 that is typically attached to the outside of a house 110. ODU 108 receives these signals and sends the received signals to IRD 112, which decodes the signals and separates the signals into viewer channels, which are then passed to monitor 114 for viewing by a user. There can be more than one satellite transmitting from each orbital location and additional orbital locations without departing from the scope of the present invention.

Satellite uplink signals 116 are transmitted by one or more uplink facilities 118 to the satellites 102-106 that are typically in geosynchronous orbit. Satellites 102-106 amplify and rebroadcast the uplink signals 116, through transponders located on the satellite, as downlink signals 120. Depending on the satellite 102-106 antenna pattern, the downlink signals 120 are directed towards geographic areas for reception by the ODU 108.

Alternatively, uplink facilities 118 can send signals via cable 122 either in conjunction with uplink signals 116 or instead of uplink signals 116 to IRD 112, for display on monitor 114.

Each satellite 102-106 broadcasts downlink signals 120 in typically thirty-two (32) different frequencies, which are licensed to various users for broadcasting of programming, which can be audio, video, or data signals, or any combination. These signals are typically located in the Ku-band of frequencies, i.e., 11-18 GHz, or in the Ka-band of frequencies, i.e., 18-40 GHz, but typically 20-30 GHz.

As satellites 102-106 broadcast additional services and additional channels to viewers, viewers will like and expect to see programming on monitor 114 that relate to their specific needs and desires.

SUMMARY OF THE INVENTION

To minimize the limitations in the prior art, and to minimize other limitations that will become apparent upon reading and understanding the present specification, the present invention discloses systems and apparatuses for monitoring advertisements during television viewing.

A system for monitoring advertisements in a broadcast television channel in accordance with the present invention comprises a sound level monitor for monitoring an audio level of a first broadcast television channel, a data tagger, coupled to the sound level monitor, for tagging a start and an end of an advertisement segment within the first broadcast television channel, and a receiver, wherein when the receiver is first tuned to the first broadcast channel and then tuned to a second broadcast channel, an on-screen display is displayed on a monitor displaying the second broadcast channel, the OSD being displayed when the end of the advertisement segment within the first broadcast channel occurs.

Such a system further optionally comprises the start and end of the advertisement segment being determined by the sound level monitor detecting audio compression, the start and end of the advertisement segment being determined by the sound level monitor detecting a reshaped sound condition, the start and the end of the advertisement segment being marked using a Vertical Blanking Interval, an Entitlement Management Message, a Conditional Access Packet, or an internet connection, a video recorder, coupled to the receiver, wherein the recorder uses the tagged start and the tagged end of the advertisement segment during recording, and the video recorder skips the advertisement segment during recording.

Another system for monitoring portions of data provided in a broadcast television channel in accordance with the present invention comprises a sound level monitor for monitoring an audio condition of a first broadcast television channel, wherein a first mark is placed at a start of the audio condition and a second mark is placed at an end of the audio condition, and a receiver, wherein when the receiver is first tuned to the first broadcast channel and then tuned to a second broadcast channel, an on-screen display is displayed on a monitor when the second mark occurs within the first broadcast channel.

Such a system further optionally comprises the audio condition being audio compression, the audio condition being a reshaped sound condition, the start of the audio condition and the end of the audio condition being marked using a Vertical Blanking Interval, an Entitlement Management Message, a Conditional Access Packet, or an internet connection, a video recorder, coupled to the receiver, wherein the recorder uses the start and the end of the audio condition during recording, and the video recorder does not record the broadcast channel between the start and the end of the audio condition.

Other features and advantages are inherent in the systems and apparatuses disclosed or will become apparent to those skilled in the art from the following detailed description and its accompanying drawings.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

Figure 1:
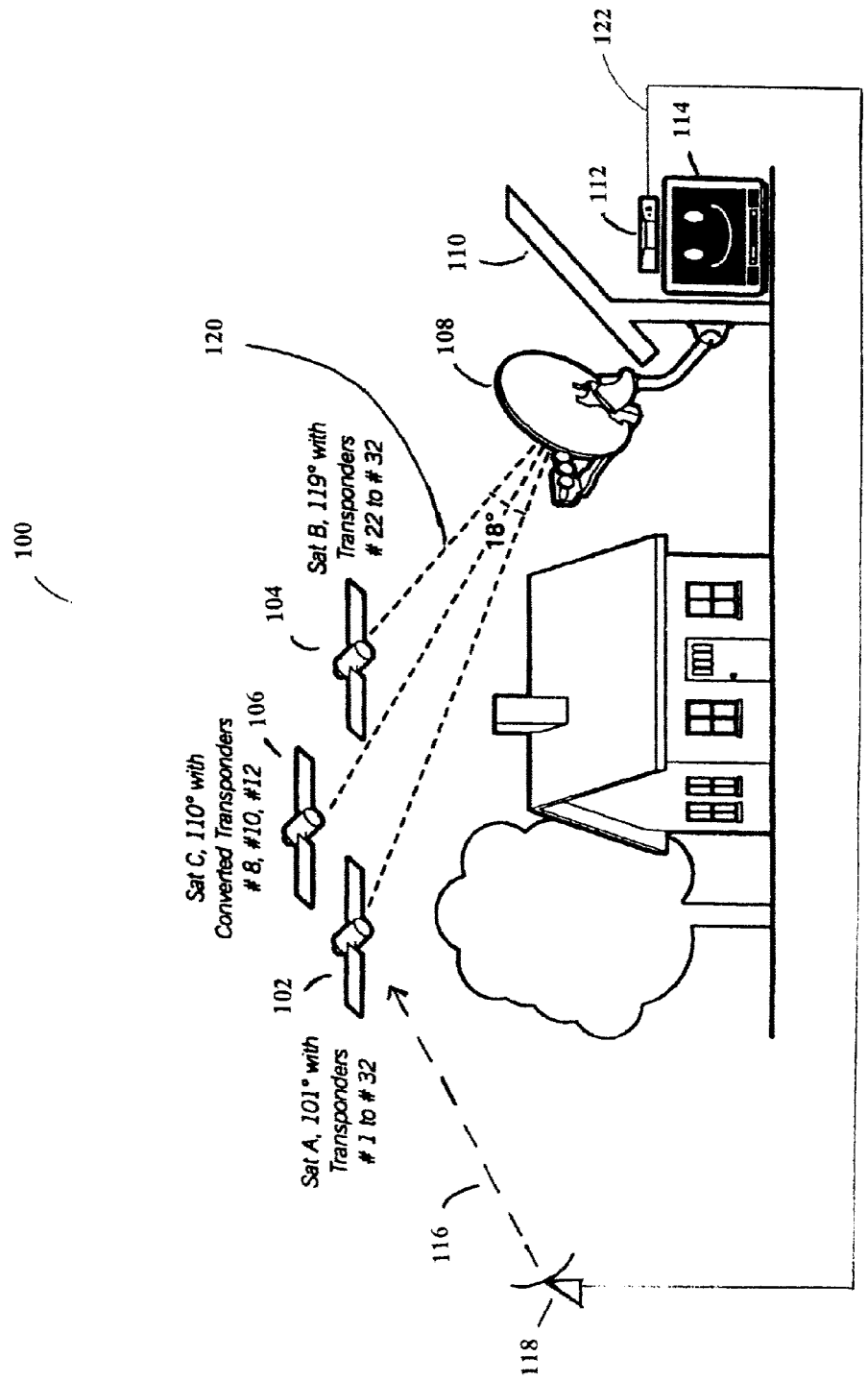
FIG. 1 illustrates a typical satellite television installation of the related art.

In the following description, reference is made to the accompanying drawings which form a part hereof, and which is shown, by way of illustration, several embodiments of the present invention. It is understood that other embodiments may be utilized and structural changes may be made without departing from the scope of the present invention.

Overview

The present invention allows the viewer who is watching live television to temporarily change channels, e.g., "channel surf," when a commercial break starts and automatically alerts/reminds the viewer when the commercial or a pod of ads (a series of back-to-back commercials) is completed on the previously tuned channel. Once the present invention is activated, the viewer can channel surf or bring up other possible services on the television receiver, e.g., games, full screen channel guides, managing the PVR schedule, etc. When the end of a pod of commercials is detected, an On-Screen Display (OSD) is shown to the viewer, reminding the viewer that the regular programming has just resumed, and queries the viewer if they wish to go back to the previous channel. The viewer can then choose to either stay on the current channel or go back to the previous live program.

When live television enters a commercial break from the main programming, the viewer can activate the monitoring system of the present invention by pressing a predetermined button on the remote control, followed by a channel up/down selection or entering the digits for a new channel selection. Alternatively, activation of the system of the present invention can be done by directly entering the channel number and hitting a special key on the remote control, e.g., the "enter" or "channel change" keys. Another activation approach is to set the receiver to have the monitoring system as the default mode for a channel change. When the default is to have the monitoring system activated, the first channel change from normal viewing triggers the monitoring to begin and establishes monitoring for that channel, and any further channel changes, until the monitoring system detects the end of the advertisement pod. The receiver can detect the base channel to monitor by user control, e.g., selection of a button on the remote control, by a viewer remaining on a channel for a specific amount of time, e.g., five minutes on a single channel, or by other methods.

Once activated, the monitoring system of the present invention continuously monitors the live program on the "base" channel until the end of the commercial break is detected. There are several modes of monitoring the commercial break, e.g., a dedicated tuner remaining on the base channel and a second tuner used for channel surfing, using a broadband or dial-up phone connection to send a request to a server for the base channel, and a message being sent back to the receiver from the server when the commercial pod is finished, having the receiver join a multicast UDP stream sent over the satellite that provides an end-of-advertisement pod for all channels carried by the multichannel broadcast operator, whether it is via satellite, cable, or broadband/dial-up. Further, a timer can be used to have a simplistic method, for commercials that are inserted at various known times in network broadcast shows.

The present invention can also monitor the commercial start and end points and mark the metadata start and end points into the PVR recording media file for advertisement-free playback, or, alternatively, automatically skip those sections during recording to save hard drive disk space.

With the monitoring system of the present invention, viewers are able to perform channel surfing or interaction with other user interface (UI) screens during live commercials and are notified in real time when the live programming resumes. Hence, the present invention enables viewers to attend to other things without missing any valuable minutes of an important live event.

Second, the present invention is capable of detecting start and end points of television commercial segments independent of their lengths. Viewers can thus choose to mark advertisements during recording for future use in various scenarios at a later time. The present invention can also insert start and end time tags into the recorded bitstream, which allows for an automated and more accurate skipping functionality during playback of recorded programming.

Remote Control

Figure 2:
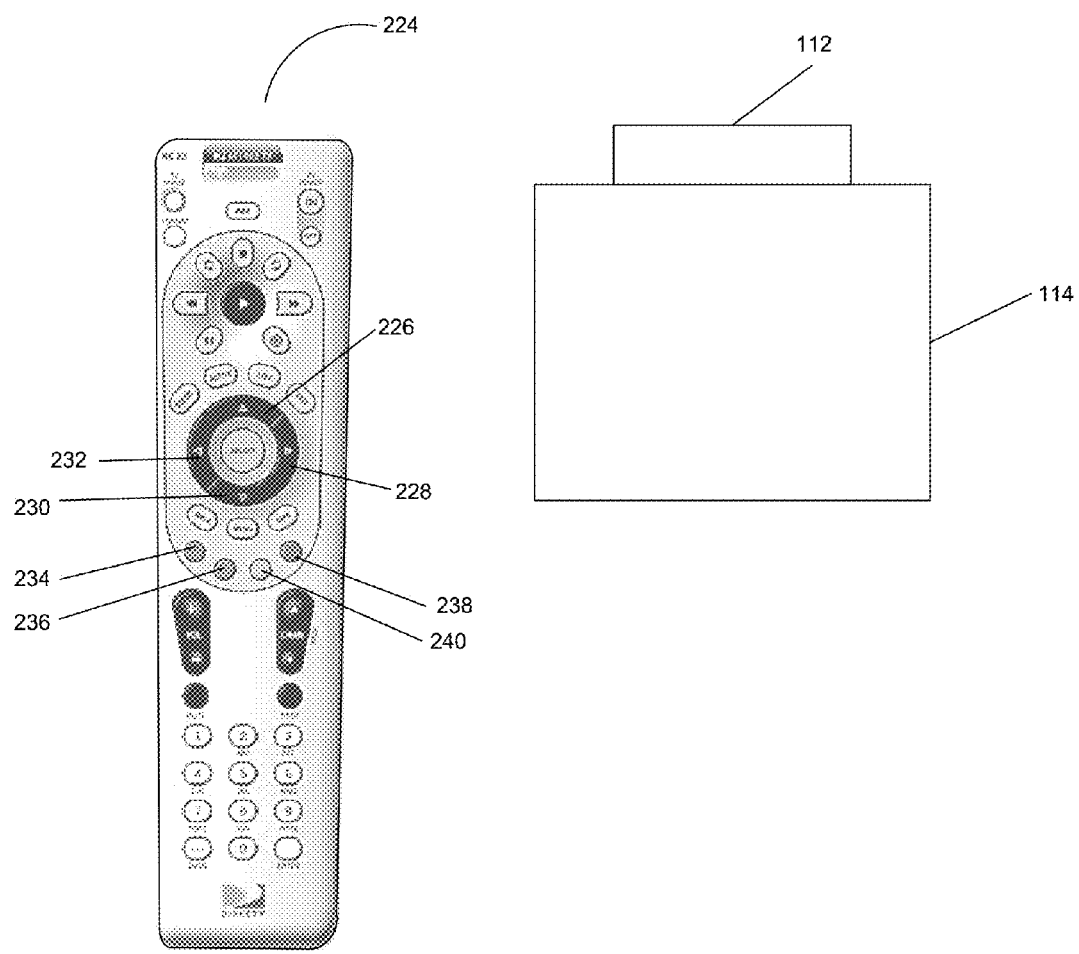
FIG. 2 illustrates a remote control used in the present invention.

FIG. 2 illustrates a remote control used in the present invention.

Typically, IRD 112 and monitor 114 are controlled by a remote control device 224, which allows viewers a convenient way to control audio volume, channel selection, and other features and display characteristics from a distance away from the IRD 112 and/or monitor 114.

The viewer has access to several commands through remote control 224, such as cursor controls which are typically controlled by buttons 226-240, but can be controlled by other buttons on the remote control 224 if desired.

System Diagram

Figure 3:
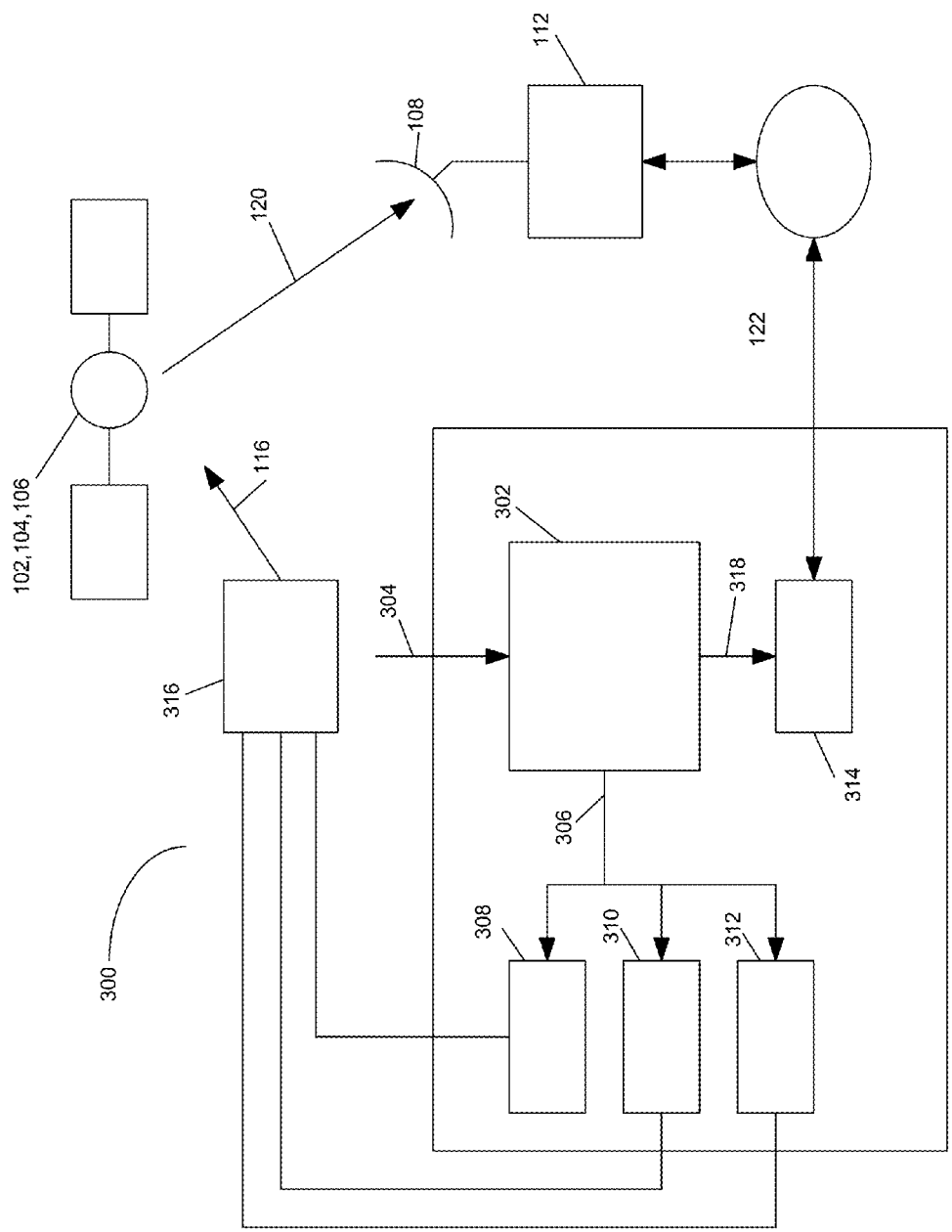
FIG. 3 illustrates a transmission portion of a system in accordance with the present invention.

FIG. 3 illustrates a transmission portion of a system in accordance with the present invention.

System 300 shows ad detection portion 302, which receives the audio, video, and text stream 304 and determines, through metadata, audio level monitoring, or other methods, the beginning (start) and end of a commercial advertisement or a pod of advertisements. As these points in the stream are determined, one or more methods are used to place marks or data points in the stream that can later be decoded by IRD 112.

The augmented video stream 306, i.e., the video stream with the start and end marks placed within, is passed to one or more of the Vertical Blanking Interface (VBI) encoder 308, Entitlement Management Message (EMM) generator 310, Conditional Access Packet (CAP) generator 312, and/or internet server 314. The outputs of the VBI encoder 308, EMM Generator 310, and CAP generator 312 are passed to the broadcast transmitter 316, and are then encoded and converted into uplink signals 116. Internet server 314 converts the start and end marks 318, which, if desired, can also contain the audio and video portion signals 304, for transmission on cable 122. Although the signals transmitted on cable 122 are typically internet protocol signals, they can use other protocols, e.g., cable television transmission protocols, without departing from the scope of the present invention.

As described with respect to FIG. 1, IRD 112 receives uplink signals 116 via downlink signals 120, and receives signals from cable 122, either via the internet on a broadband or dial-up connection, or via cable link to IRD 112.

Start and End of TV Commercial Detection

The system 300 of the present invention enables viewers to avoid TV ads during a live broadcast, omit ads during a recording, and/or skip over ads during a playback.

By monitoring the video and audio stream 304 with ad detection portion 304, the system 300 detects changes in the audio levels of the stream 304 to determine the start and end times of commercials. These start and end times are then transmitted along with the audio/video stream via satellite, or can also be sent via a secondary transmission link such as the internet, to IRD 112.

For example, and not by way of limitation, by using a broadband or dial-up connection via cable 122, the IRD 112 registers a monitoring request to server 314, which replies with a message to IRD 112 when the commercial pod is starting or ending.

In another example, again not by way of limitation, using the satellite downlink 120, or a broadband/dial-up connection, IRD 112 can join a multicast UDP broadcast that alerts when all channels for a given-multi-channel broadcast operator are entering or exiting an advertisement pod.

Audio Signature Analysis

Ad detection portion 304 typically detects one, two, or both of the often found audio signatures employed by commercial advertisements. The first is "audio compression" where a commercial's sound track is recorded at a constant and maximum loudness level. The second is "reshaping the sound" where the frequencies that human hearing is most sensitive to are raised in level, while other frequencies are reduced in sound level. A reshaped sound condition or an audio compression condition is detected by ad detection portion 304, and start and end tags are applied to the signal at the points where the audio signatures meet the required conditions.

System 300 of the present invention allocates a tuner to the tuned channel and continuously monitors audio sound levels. Commercials are distinctive in the audio spectrum and/or volume. By continuously monitoring the channel, the present invention can sample the audio levels and compare that to the audio levels employed by commercials. Fuzzy logic can be applied to determine if the match is "close enough" to a commercial audio track to determine commercial or commercial pod location. In DVR systems, the recorded content is preferably indexed with a START marking such that a DVR that is attached to IRD 112 can mark the locations where the commercial segments are recorded, and can use the markings to best utilize the commercial segments.

When there is a run or pod of commercials, each separated by a possible split second fade to black or muted audio, the system 300 has a latency to look ahead to determine whether the next segment is normal programming or another commercial before alerting the viewer that the commercial pod is complete. When determination is made that the final end of commercials has occurred, and resumption of normal programming has started, an END mark can be placed in the VBI interval via VBI generator 308, and/or an EMM or CAP can be generated as part of the signal. The appropriate messages are then sent to IRD 112 via uplink 116 and/or cable 122. In DVR systems an END mark is preferably made in the record content, which is saved with the recorded media file. On playback from the DVR, these marks can be used to skip the sections between the START and END marks, or, optionally, real-time audio analysis can be done even during recording or time-shifted playback.

Per Channel CAP Announcement

Commercial end announcements can be sent to the IRD 112 over the satellites 102-106 in a Conditional Access Packet (CAP) via CAP generator 312 or Entitlement Management Message (EMM) via EMM generator 310 per viewer channel. CAPs could be sent on all of the transponders, so no second dedicated tuner would be needed in the IRD to continuously monitor these announcements for the channel of interest. In essence, IRD 112 would be tuned to a first channel, but the CAP/EMM messages of every channel would be part of the data stream for that channel, such that the tuner would be able to decode the start and end of commercials on every channel available to the IRD at a given time.

However, another approach is to use a dedicated single transponder or group of transponders for the CAPs or EMMs because of the system wide bandwidth savings. However, in such a system, the IRD 112 would need a dedicated tuner and transport filter to monitor the CAP/EMM messages while a second tuner tunes to the channel of interest.

The server 314 is equipped with monitoring equipment for each channel being broadcast in the multi-channel system. The server 314 tracks the start and end of each commercial pod per transmitted channel. The server 314 employs the audio monitoring technique and passes those messages as START and END marks, either via CAP, EMM, or other protocol, to IRD 112 via cable 122.

Real-Time Status Over Broadband Connection

In this mode of operation, the IRD 112 can receive real-time status of the monitored channel from the internet server 314 via cable 122. For example, and not by way of limitation, the IRD 112 can use port forwarding and use UDP or TCP near-real-time advertisement start and end notification messages. The IRD 112 can request notifications for all channels in the network or for a requested subset of channels in the network. Alternatively, the IRD 112 can join a multicast UDP stream or use a global or channel specific RSS stream with the start and end notifications, again, with the ability to request notifications for all channels or some subset of the full complement of channels. Real-time status includes the start and end marks associated with advertisements, as well as the start and end marks of a pod or series of advertisements. The system 300 of the present invention is thus able to determine when a commercial is over and another commercial has started, or when a pod ends and the regular programming resumes, as in many IP-based television networks.

An alternative system 300 uses internet server 314 to provides this service only for IRDs 112 that are connected to and request notification of commercial start and end times from server 314. Notification can be sent by HTTP or XML, or any other internet protocol. Another method that can be used by system 300 is through User Datagram Protocol (UDP) where the IRD 112 connects to an associated IP port for a channel of interest in the broadcast stream.

Tags Embedded in the Vertical Blanking Interval (VBI)

Within the MPEG and DVBS standards, commercials and programming are identified in the VBI field of content that uniquely identifies the content material. If this is being provided, then the system can monitor this information and the tags within the VBI, and can thus be used to distinguish the start or end of a commercial.

The start and end of commercial tags can be embedded in the VBI, which is currently used to broadcast closed captioning and data. In digital networks, the VBI is represented as a field in the MPEG Group Of Pictures (GOP) header.

No second tuner is required to continuously monitor VBI on the channel of interest for embedded tags for the currently tuned channel. However, once the monitoring system of the present invention is activated and the viewer begins channel surfing, then a second tuner would be required to determine the Tags of the channel being monitored. Similarly, the tags can be embedded directly into the GOP header.

Setting Up the Monitoring System

Set Alert and Then Channel Surf

The system 300 of the present invention can be engaged during the viewing of any given channel. One approach is that once a commercial or pod of commercials starts, the viewer then changes channels to see what other programs are on, or attends to PVR scheduling issues, etc. When the advertisement or advertisement pod ends, an On-Screen Display (OSD) alert screen is displayed on the monitor 114 to inform the viewer that the advertisement ended and the program that the viewer was previously watching has resumed. The OSD gives the viewer a choice to return to the previous channel or to remain on the current channel via button choices on the remote control.

Figure 4:
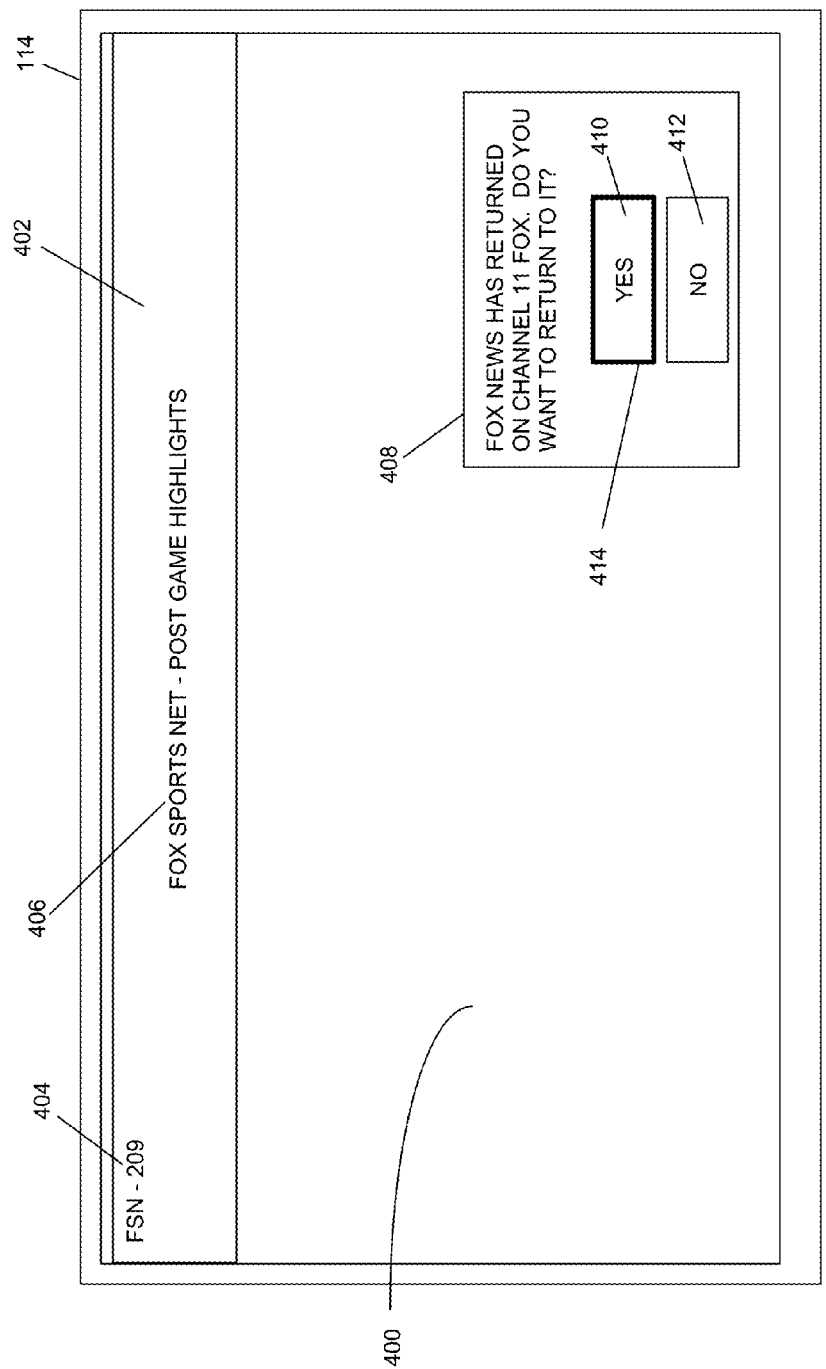
FIG. 4 illustrates an on-screen display in accordance with the present invention.

FIG. 4 illustrates an on-screen display in accordance with the present invention.

On monitor 114, video 400 is shown, which comprises header 402 that is typically shown for a periodic time during channel changes within system 100. Header 402 comprises a channel indicator 404 and a show identifier 406 that gives a channel and text description to inform the viewer of the general nature of the video being viewed on monitor 114.

Immediately prior to switching to video 400, the viewer was watching another viewer channel, e.g., channel 11. With the present invention engaged in system 300, either via VBI, EMM, CAP, or internet signaling to IRD 112, when commercials have ended on the previous channel, e.g., channel 11, OSD 408 is displayed on the current channel as an overlay to video 400. Within OSD 408, although the selection can be outside of OSD 408 if desired, selection graphics 410 and 412 can be provided. Using remote control 224 buttons 226-240, or other buttons on the remote control 224, to select graphic 410 or move the cursor 414 to graphic 412 and select graphic 412. Graphics 410 and 412 can also be ascribed or assigned to specific buttons, e.g., red button 234 for "no" and green button 236 for "yes" such that movement of cursor 414 is not needed; a single button press can be used to indicate the viewer's desire or lack of desire to return to the previously viewed channel.

Selection of the use of the present invention can be automatic, e.g., every time a user switches channels, the previous channel is monitored for commercial start and end tags. However, the system 300 can also place restrictions on the use of the monitoring resources, e.g., the user must activate the system through the remote control 224, the IRD 112 must remain on a specific channel for a predetermined or user-defined amount of time, or other automatic or user-defined parameters to limit the use of system 300 within system 100. For example, if a user is channel surfing, or does not remain on a channel for a specific amount of time, the system can ignore intermediate channel changes. If a base channel is not designated by the user, either via remote control 224 activation or via remaining on a specific channel for a given amount of time, the system 300 of the present invention can be programmed to not display the OSD 408.

For example, the "base" program can be specified by the viewer by pressing a special key on remote control 224 while tuned to that program. All channel changes from the base program automatically activate system 300 which then monitors that program. Once designated as a "base" program, the event is monitored until the program ends, the designation is canceled, or another event is selected to be the new "base" program.

Omit Commercials during Recording

With the system 300 of the present invention, viewers can choose not to record commercials by setting up a DVR attached to IRD 112 during a request to record the show. During DVR setup, an additional selection is given to the viewer to record the entire program or to record only the program without the commercials. If the latter is selected, the program is recorded without the commercials through the DVR/IRD 112 monitoring of the start and end tags in accordance with the present invention.

Skipping Commercials During Playback

When the user chooses to record a program in its entirety, the present invention still can insert start and end of commercial tags at the start and end of commercials in the recorded bitstream. The commercial demarcations make it possible for the DVR/IRD 112 to precisely skip commercials during a playback of the recorded program, even though the commercials were initially recorded.

Uses for the start and end marks of commercials and commercial pods other than skipping the commercials during recording and playback are possible within the scope of the present invention.

CONCLUSION

Although described with respect to advertisements, other portions of the broadcast channel can also be marked, either by the system 100 provider or by the user. Such marks can be used to skip forward during PVR playback, can be time-dependent (e.g., once a start tag or mark is placed, the end mark or tag automatically follows in two minutes, three minutes, etc.). Further, the IRD 112 can display the OSD 408 and automatically switch back to the first broadcast channel within a predetermined amount of time (e.g., 5 seconds) upon detection of the end mark rather than asking the viewer to make a choice.

A system for monitoring advertisements in a broadcast television channel in accordance with the present invention comprises a sound level monitor for monitoring an audio level of a first broadcast television channel, a data tagger, coupled to the sound level monitor, for tagging a start and an end of an advertisement segment within the first broadcast television channel, and a receiver, wherein when the receiver is first tuned to the first broadcast channel and then tuned to a second broadcast channel, an on-screen display is displayed on a monitor displaying the second broadcast channel, the OSD being displayed when the end of the advertisement segment within the first broadcast channel occurs.

Such a system further optionally comprises the start and end of the advertisement segment being determined by the sound level monitor detecting audio compression, the start and end of the advertisement segment being determined by the sound level monitor detecting a reshaped sound condition, the start and the end of the advertisement segment being marked using a Vertical Blanking Interval, an Entitlement Management Message, a Conditional Access Packet, or an internet connection, a video recorder, coupled to the receiver, wherein the recorder uses the tagged start and the tagged end of the advertisement segment during recording, and the video recorder skips the advertisement segment during recording.

Another system for monitoring portions of data provided in a broadcast television channel in accordance with the present invention comprises a sound level monitor for monitoring an audio condition of a first broadcast television channel, wherein a first mark is placed at a start of the audio condition and a second mark is placed at an end of the audio condition, and a receiver, wherein when the receiver is first tuned to the first broadcast channel and then tuned to a second broadcast channel, an on-screen display is displayed on a monitor when the second mark occurs within the first broadcast channel.

Such a system further optionally comprises the audio condition being audio compression, the audio condition being a reshaped sound condition, the start of the audio condition and the end of the audio condition being marked using a Vertical Blanking Interval, an Entitlement Management Message, a Conditional Access Packet, or an internet connection, a video recorder, coupled to the receiver, wherein the recorder uses the start and the end of the audio condition during recording, and the video recorder does not record the broadcast channel between the start and the end of the audio condition.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but by the claims appended hereto and the full range of equivalents to the claims appended hereto.

What is claimed is:

1. A method of monitoring an advertisement pod, comprising:
   receiving at least a beginning of an advertisement pod having one or more advertisements on a first broadcast channel of a plurality of broadcast channels in a receiver, the advertisement pod having an end;
   determining if the first broadcast channel is a base broadcast channel;
   accepting a command to tune the receiver from the first broadcast channel to a second broadcast channel while receiving the at least the beginning of the advertisement pod on the first broadcast channel;
   tuning the receiver to the second broadcast channel of the plurality of broadcast channels and providing content transmitted on the second broadcast channel for display, while monitoring for information designating the end of the advertisement pod; and
   providing an on screen display (OSD) indicating the end of the first advertisement pod for display according to the monitored information only if the first broadcast channel is determined to be a base broadcast channel;
   wherein the first broadcast channel is determined to be the base broadcast channel according to at least one of:
   a user selected input identifying the channel as the base broadcast channel; and
   a time period in which the first broadcast channel is tuned before tuning the receiver from the first broadcast channel to the second broadcast channel.

2. The method of claim 1, wherein the first broadcast channel is determined to be the base broadcast channel according to user selected input identifying the channel as the base broadcast channel.

3. The method of claim 1, wherein the first broadcast channel is determined to be the base broadcast channel according to a time period in which the first broadcast channel is tuned before tuning the receiver from the first broadcast channel to the second broadcast channel.

4. The method of claim 3, wherein the time period is user defined.

5. The method of claim 1, wherein monitoring for information designating the end of the advertisement pod comprises monitoring the first broadcast channel.

6. The method of claim 5, wherein the receiver comprises two tuners and the first broadcast channel is received by the first tuner and the second broadcast channel is received by the second tuner.

7. The method of claim 1, wherein:
   the first broadcast channel is transmitted via a first transponder;
   the second broadcast channel is transmitted via a second transponder;
   the information is transmitted via the first transponder and the second transponder; and
   monitoring for the information comprises monitoring the second broadcast channel.

8. The method of claim 1, wherein the information comprises a tag associated with the end of the advertisement pod, and the information is transmitted in a vertical blanking interval, a conditional access package, or an entitlement management message.

9. The method of claim 1, wherein monitoring for information designating the end of the advertisement pod comprises monitoring a secondary communications link independent from the plurality of broadcast channels.

10. The method of claim 9, wherein monitoring the secondary communications link comprises:
    registering a monitoring request with a server; and
    receiving the information from the server.

11. The method of claim 9, wherein the receiver requests a notification message for each of the plurality of broadcast channels, and the information comprises one of the notification messages.

12. The method of claim 9, wherein the receiver requests a notification message for a subset of each of the plurality of broadcast channels, and the information comprises one of the notification messages.

13. The method of claim 10, wherein the information is received via a user datagram protocol (UDP) multicast broadcast.

14. A receiver, comprising:
    a tuner, for selectably receiving one of a plurality of broadcast channels, including a first broadcast channel and a second broadcast channel, the first broadcast channel transmitting an advertisement pod having one or more advertisements and having an end;
    wherein the receiver determines if the first broadcast channel is a base broadcast channel, and when the receiver accepts a command to tune from the first broadcast channel to the second broadcast channel while receiving at least a beginning of the advertisement pod, the receiver:
    tunes to the second broadcast channel and provides content transmitted on the second broadcast channel for display, while monitoring for information designating the end of the advertisement pod; and
    provides an on screen display (OSD) for display according to the monitored information designating the end of the advertisement pod;
    wherein the first broadcast channel is determined to be the base broadcast channel according to at least one of:
    a user selected input identifying the channel as the base broadcast channel; and
    a time period in which the first broadcast channel is tuned before tuning the receiver from the first broadcast channel to the second broadcast channel.

15. The receiver claim 14, wherein the receiver:
    further determines if the first broadcast channel is a base broadcast channel, and monitors the information designating the end of the advertisement pod and providing the OSD only if the first broadcast channel is a base broadcast channel.

16. The receiver of claim 15, wherein the first broadcast channel is determined to be the base broadcast channel according to user selected input identifying the channel as the base broadcast channel.

17. The receiver of claim 15, wherein the first broadcast channel is determined to be the base broadcast channel according to a time period in which the first broadcast channel is tuned before accepting the command to tune the receiver from the first broadcast channel to the second broadcast channel.

18. The receiver of claim 17, wherein the time period is user defined.

19. The receiver of claim 18, wherein the receiver monitors the first broadcast channel for the information designating the end of the advertisement pod.

20. The receiver of claim 19, wherein the receiver comprises a second tuner and the second broadcast channel is received by the second tuner.

21. The receiver of claim 14, wherein:
the first broadcast channel is transmitted via a first transponder;
the second broadcast channel is transmitted via a second transponder;
the information is transmitted via the first transponder and the second transponder; and
the receiver monitors for the information by monitoring the second broadcast channel.

22. The receiver of claim 14, wherein, the information comprises a tag associated with the end of the advertisement pod, and the information is transmitted in a vertical blanking interval, a conditional access package, or an entitlement management message.

23. The receiver of claim 14, wherein the receiver monitors for information designating the end of the advertisement pod by monitoring a secondary communications link independent from the plurality of broadcast channels.

24. The receiver of claim 23, wherein the receiver monitors the secondary communications link by registering a monitoring request with a server and receiving the information from the server.

25. The receiver of claim 24, wherein the information is received via a user datagram protocol (UDP) multicast broadcast stream.

\* \* \* \* \*